Oct. 17, 1950     J. B. ADAMS     2,526,105
UNIVERSAL JOINT FOR HAND TOOLS
Filed Jan. 13, 1947
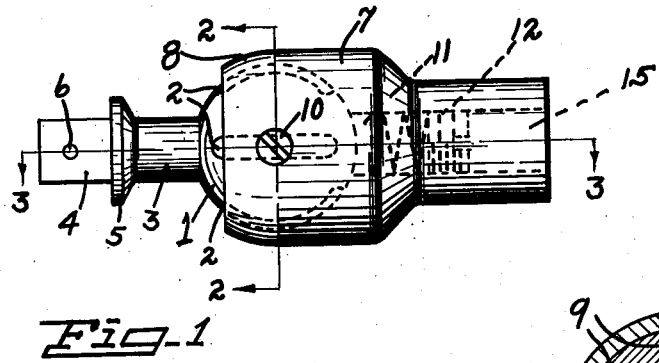
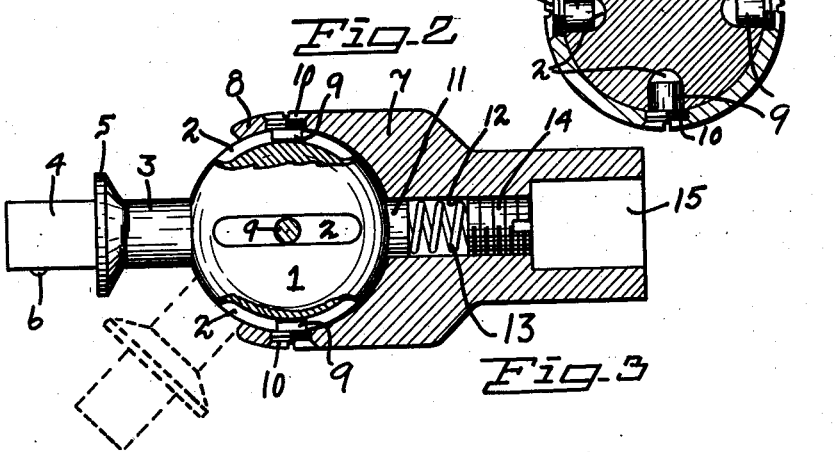
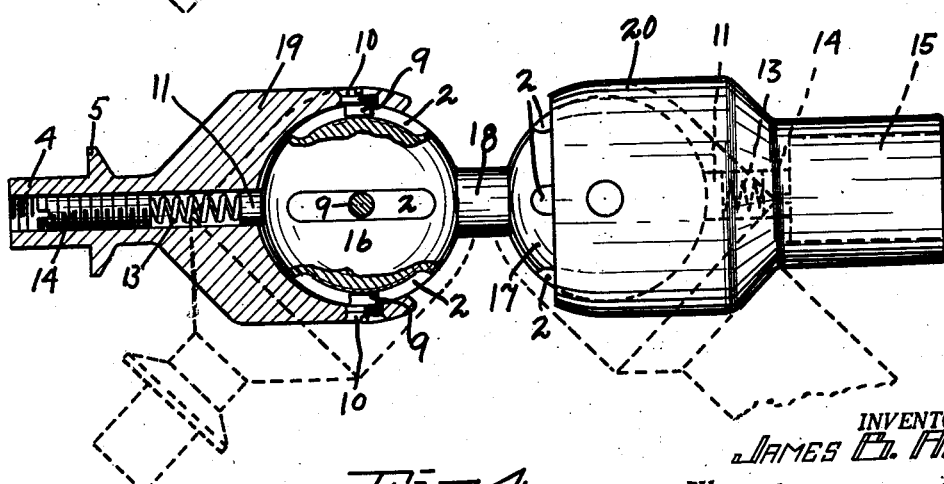
INVENTOR.
JAMES B. ADAMS
BY
Glenn L. Fish
ATTORNEY Patented Oct. 17, 1950

2,526,105

UNITED STATES PATENT OFFICE 2,526,105

UNIVERSAL JOINT FOR HAND TOOLS

James B. Adams, Havre, Mont.

Application January 13, 1947, Serial No. 721,788

2 Claims. (Cl. 64—7)

My present invention relates generally to flexible joints or couplings, and more specifically to an improved universal joint for hand tools of the rotary type, which while especially adapted for use as a component part of a socket wrench and similar hand tools, is also available for use in flexible rod joints and similar mechanical structures.

The primary object of the invention is the provision of a joint structure comprising a minimum number of parts that may with facility be manufactured at comparatively low cost of production and assembled with convenience to assure a smooth operating joint of simple construction.

The universal joint, as an article of manufacture may be associated at one end with an actuating handle, and at its other end it may be equipped with a detachable operating device, such as a socket wrench, and the tool thus equipped may be employed in desired angular positions in usually inaccessible places for turning bolts or nuts, as an example of the utility of the novel device.

The invention consists in certain novel features of construction and combinations and arrangements of parts as will hereinafter be described and more fully set forth in the appended claims.

In the accompanying drawings I have illustrated one complete example of a physical embodiment of my invention in which the parts are combined and arranged according to a satisfactory mode I have devised for the practical application of the principles of my invention. It will, however be understood that changes and alterations are contemplated and may be made in these exemplifying drawings and mechanical structures, as is evidenced by the modified form of the invention showing a double joint that involves the principles of my invention.

Figure 1 is a view in side elevation of an article of manufacture involving a single joint constructed according to my invention.

Figure 2 is a transverse sectional view at line 2—2 of Fig. 1; and

Figure 3 is a longitudinal sectional view at line 3—3 of Figure 1.

Figure 4 is a view in side elevation and partial longitudinal sectional view showing the embodiment of the invention in a double joint.

In carrying out my invention I employ as one member of the universal joint a ball or spherical head 1 having four exterior arcuate circumferentially extending grooves indicated at 2 that are arranged in two diametrically disposed pairs, and the perpendicular axes of these pairs intersect at the center of the spherical head.

The ball is provided with an integral shank 3 that terminates in an angular or squared attaching head 4 that is to be fitted in a complementary socket of a rotary tool, as for instance a socket wrench; and an integral flange 5 forms a stop for the head. The attaching head may be equipped with any suitable quick detachable fastening means for the socket of a tool to which it is attached, as indicated at 6 in Figs. 1 and 2.

The complementary member 7 of the joint includes an enlarged hollow truncated spherical socket head 8 having an interior seat conforming to the ball or spherical head 1, and the open end of the socket wall, or truncated sphere, is pressed or rolled down in a suitable machine tool to enclose a major portion of the ball 1 and thus confine the ball within its seat.

For co-action with the four circumferential grooves 2 in the periphery of the ball 1, the socket head 8 is equipped with four radially extending pins or axial trunnions 9 having threaded heads 10 that are screwed through holes in the wall of the socket head. These pins or trunnions are arranged in axial pairs to form two sets of swivel points for the ball 1, and the axis of each pair of pins passes through the center point of the ball 1 and the socket head so that the two members may be flexed, as indicated by dotted lines in Fig. 3 to a multiplicity of angles.

In order to prevent lost motion, compensate for wear between the members of the joint, and to apply a degree of frictional pressure that will brake the jointed parts, a friction disk or detent 11 is mounted in an axial bore 12 of the socket member 7. A helical spring 13 is confined in the bore 12 between the brake disk or friction disk 11 and a screw bolt 14, and the screw bolt may be turned in the threaded portion of the bore to adjust the tension of the spring to vary the pressure or braking action of the spring pressed detent against the periphery of the ball 1.

Access to the adjusting bolt or screw may be had through an open socket head 15 alined with the threaded bore, and in actual use a handle portion or operating head is inserted in the socket 15 for turning the rotary tool.

If the joint as an article of manufacture is employed with interchangeable parts in a socket wrench, the joint may be flexed as desired in order to work the socket wrench around a corner, or in other usually inaccessible places.

In addition to the use of the invention in a single joint, a double joint may be utilized as indicated in Fig. 4 where two spaced balls or spherical heads 16 and 17 are united by an intermediate integral shank or stem 18, and two truncated spheres 19 and 20 form the respective seats for these balls or heads.

The balls are fashioned with the circumferential grooves 2, and the socket members are provided with the complementary axial pairs of swivel trunnions 9. Each of the double joints is equipped with the braking mechanism including the spring pressed detents 11, and the members are fashioned with the utility head 4 and socket 15, and the double joint may be flexed to a multiplicity of angles within the length of the circumferential grooves 2 as indicated by dotted lines in Fig. 4.

Having thus fully described my invention, what I claim as new and desire to secure by Letters Patent is:

1. In a universal joint, the combination with a ball having two pairs of diametrically arranged exterior circumferential grooves, of a socket head including a truncated sphere enclosing a major portion of the ball, four radially arranged trunnions in the wall of the truncated sphere and movable in said grooves, said socket head having an axial bore and a detent mounted therein for frictional engagement with the ball, an adjusting screw mounted in the bore, and a tension spring interposed between said detent and the adjusting screw.

2. In a double universal joint for a flexible working tool, the combination with a pair of spaced balls having an intermediate integral shank and each ball having two pairs of diametrically arranged exterior circumferential grooves, of a pair of socket heads having means for attachment to a tool and each socket head including a truncated sphere enclosing a major portion of a ball, each said socket head also having four radially arranged trunnions projecting into the grooves, said socket heads each having an axial bore, and a spring pressed detent mounted in each bore for frictional engagement with a ball.

JAMES B. ADAMS.

REFERENCES CITED

The following references are of record in the file of this patent:

UNITED STATES PATENTS

| Number | Name | Date |
|---|---|---|
| 794,247 | Palmer | July 11, 1905 |
| 1,411,106 | Judd | Mar. 28, 1922 |
| 1,719,310 | Rawlings | July 2, 1929 |
| 1,835,315 | McLay | Dec. 8, 1931 |
| 1,838,310 | Hubbel | Dec. 29, 1931 |
| 1,978,590 | McNaught | Oct. 30, 1934 |
| 2,304,766 | Pratt | Dec. 8, 1942 |

FOREIGN PATENTS

| Number | Country | Date |
|---|---|---|
| 388,518 | France | 1908 |